US012577772B2

(12) United States Patent
Kuru et al.

(10) Patent No.: US 12,577,772 B2
(45) Date of Patent: Mar. 17, 2026

(54) NOISE CANCELLATION FOR TOILET

(71) Applicant: Kohler Co., Kohler, WI (US)

(72) Inventors: William Kuru, Plymouth, WI (US); Jason M. Kwacz, Kohler, WI (US)

(73) Assignee: Kohler Co., Kohler, WI (US)

( * ) Notice: Subject to any disclaimer, the term of this patent is extended or adjusted under 35 U.S.C. 154(b) by 140 days.

(21) Appl. No.: 18/495,277

(22) Filed: Oct. 26, 2023

(65) Prior Publication Data

US 2024/0141635 A1 May 2, 2024

Related U.S. Application Data

(60) Provisional application No. 63/419,869, filed on Oct. 27, 2022.

(51) Int. Cl.
*E03D 11/13* (2006.01)
*G10K 11/178* (2006.01)

(52) U.S. Cl.
CPC ............ *E03D 11/13* (2013.01); *G10K 11/178* (2013.01); *G10K 2210/105* (2013.01)

(58) Field of Classification Search
CPC ........................................................ E03D 11/13
See application file for complete search history.

(56) References Cited

U.S. PATENT DOCUMENTS

| | | | |
|---|---|---|---|
| 8,615,822 B2 | 12/2013 | Vargas et al. | |
| 8,701,220 B2 | 4/2014 | Vargas et al. | |
| 9,743,903 B1 | 8/2017 | Hall et al. | |
| 10,072,406 B2 | 9/2018 | Hall et al. | |
| 10,437,263 B2 | 10/2019 | Kuru et al. | |
| 10,557,402 B2 | 2/2020 | Le Roy et al. | |
| 10,748,539 B2 | 8/2020 | Bargetzi et al. | |
| 11,047,123 B2 | 6/2021 | Kuru et al. | |
| 11,427,995 B2 | 8/2022 | Kuru et al. | |
| 2006/0039569 A1* | 2/2006 | Antaki | G10K 11/17881 381/71.1 |
| 2010/0299822 A1* | 12/2010 | Vargas | E03D 1/263 4/354 |
| 2016/0265206 A1 | 9/2016 | White | |
| 2017/0356176 A1* | 12/2017 | Hall | A47K 13/30 |
| 2019/0089550 A1* | 3/2019 | Rexach | A47K 5/1217 |
| 2020/0326257 A1 | 10/2020 | Szurley et al. | |

FOREIGN PATENT DOCUMENTS

| | | |
|---|---|---|
| EP | 2858066 A3 | 4/2015 |
| EP | 2438243 B1 | 8/2017 |
| ES | 1165611 Y | 12/2016 |

(Continued)

OTHER PUBLICATIONS

HyperPhysics https://hyperphysics.phy-astr.gsu.edu/hbase/Audio/mic.html dated Mar. 2006; printed May 12, 2025 (Year: 2006).*

*Primary Examiner* — Christine J Skubinna
(74) *Attorney, Agent, or Firm* — Lempia Summerfield Katz LLC

(57) ABSTRACT

An active noise cancellation system for a toilet comprising a lid configured to cover a bowl of the toilet, a microphone configured to detect noises associated with the toilet, and a coil coupled to the lid and configured to causes vibrations in the lid to emit sounds derived from the detected noises associated with the toilet.

18 Claims, 13 Drawing Sheets

(56) References Cited

FOREIGN PATENT DOCUMENTS

| | | | | |
|---|---|---|---|---|
| GB | 2446474 | B | | 2/2009 |
| JP | 05132986 | A | * | 5/1993 |
| JP | 2015096675 | A | | 5/2015 |
| KR | 2019990038116 | U | | 10/1999 |
| KR | 200207822 | Y1 | | 12/2000 |
| KR | 100314860 | B1 | | 11/2001 |
| KR | 1020070097391 | A | | 10/2007 |
| KR | 100953175 | B1 | | 4/2010 |
| KR | 101010058 | B1 | | 1/2011 |
| KR | 1020110004000 | A | | 1/2011 |
| KR | 2020120002124 | U | | 3/2012 |
| KR | 101228989 | B1 | | 2/2013 |
| KR | 101527640 | B1 | | 6/2015 |
| KR | 101682338 | B1 | | 12/2016 |

* cited by examiner

NOISE CANCELLATION FOR TOILET

This application claims priority benefit of Provisional Application No. 63/419,869 filed Oct. 27, 2022, which is hereby incorporated by reference in its entirety.

FIELD

The present application relates to noise cancellation for noise associated with a toilet or other noises in a bathroom setting.

BACKGROUND

Toilets are sometimes associated with embarrassing noise made by human waste being expelled from the body (solid, liquid or gaseous) and/or striking the toilet or water within the toilet bowl. The toilet itself produces sounds in the flushing sequence as well as refilling water into the tank. Modern toilets have a very particular noise associated with the flush and refill cycles. This noise is mostly perceived to be unpleasant since it is associated with toileting. During the quiet hours of the night, toilets can disturb family members who are light sleepers. Consequently, users often delay flushing during these periods leaving waste in the bowl for periods of time. Some stealthy users find the noise undesirable because they do not want others to hear noises from the bathroom. Finally, toilets with a pleasant sound can give a higher perception of quality.

The following embodiments attenuates the flush and refill noise of the toilet to lower audible and/or quality levels to make the toileting experience more gracious for all users.

BRIEF DESCRIPTION OF THE DRAWINGS

Exemplary embodiments are described herein with reference to the following drawings, according to an exemplary embodiment.

DETAILED DESCRIPTION

Many attempts have been made in achieving a quieter flush for a toilet. Usually, any improvements have been made through hydrodynamics of the flush. For example, lowering the water volume of the flush. Other attempts to reduce noise emanating from flushing may include mufflers or other mechanical devices to dampen the sounds of human waste. These techniques are typically ineffective due to cost or effectiveness.

A similar effect to reduce toilet noise may be realized by creating sounds to counter the flush. The following embodiments include a noise cancellation system that generates sounds that are inversely related to the toilet noise. In some examples, the anti-noise is the inverse of the toilet noise. In other examples, the anti-noise may only include certain components of the inverse of the toilet noise. For example, the noise cancellation system may include one or more filters for altering the toilet noise or the inverse of the toilet noise. The altered toilet noise or the altered inverse of the toilet noise may be adapted for reproduction by a transducer that vibrates the lid of the toilet. In the alternative or in addition, the toilet lid may be coupled to one or more resonators adapted to dampen or eliminate the toilet noise.

Figure 1:
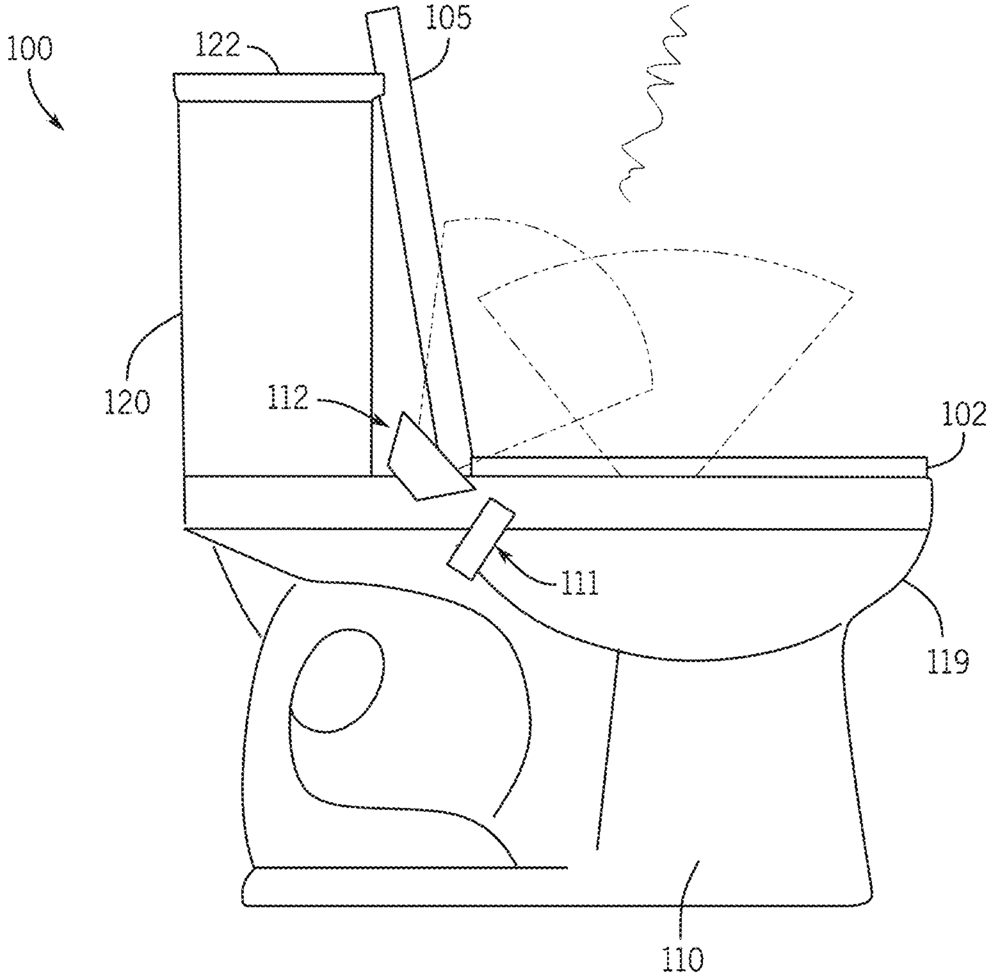
FIG. 1 illustrates an example toilet with a noise cancellation system.

FIG. 1 illustrates an example toilet 100 with a noise cancellation system. The toilet 100 includes a toilet seat 102 and a lid 105 as well as other components. The toilet 100 may include a base 110 (e.g., a pedestal, bowl, etc.) and a tank 120. The base 110 is configured to be attached to another object such as a drainpipe, floor, or another suitable object. The base 110 includes a bowl 119, a sump (e.g., a receptacle) disposed below the bowl 119, and a trapway fluidly connecting the bowl 119 to a drainpipe or sewage line. The tank 120 may be supported by the base 110, such as an upper surface of a rim. The tank 120 may be integrally formed with the base 110 as a single unitary body. In other embodiments, the tank 120 may be formed separately from the base 110 and coupled (e.g., attached, secured, fastened, connected, etc.) to the base 110. The toilet 100 may further include a tank lid 105 covering an opening and inner cavity in the tank 120. The toilet 100 may include a seat assembly including a seat 102 and a seat cover or lid 105 rotatably coupled to the base 110. A tankless toilet may also be used. Additional, different, or fewer components may be included.

The toilet 100 is formed from vitreous china or other suitable sanitary material. For example, according to other exemplary embodiments, the toilet 100 may be formed from a polymer, metal, or composite or from multiple components having different materials and assembled into a single flush engine assembly. The sanitary material is configured to engage waste and waste water and be easily cleanable and resilient to cleaning chemicals. The toilet may be cast and assembled, and then both the inner and outer surfaces of the entire toilet may be glazed and certain treatments may be applied to the surface of the bowl and/or trapway to provide desired performance characteristics (e.g., anti-staining or other coatings may be applied).

A speaker 112 and microphone 111 may be integrated with the toilet 100. In some examples, the speaker 112 and/or the microphone 111 may be mounted in recesses or cavities formed in the toilet 100. In other examples, a housing or mount may secure the speaker 112 and/or the microphone 111 to the toilet 100.

The toilet 100 may be formed in a single piece or two pieces. For example, the entire base 110 (including the bowl, sump, trapway, waterways, and any aesthetic features on the outer surface of the base) is cast from a vitreous china material in a single casting operation such that all of the components are integrally formed. Likewise, the tank 120 may be case from vitreous china material in a single casting operation.

The speaker 112 and/or the microphone 111 may be supported by the vitreous china of the toilet 100. The speaker 112 and/or the microphone 111 may be installed in a cavity formed by inserting a mold in the vitreous china material when the toilet 100 is cast. In some examples, the speaker 112 and/or microphone 111 may be molded into (i.e., embedded within) the base 110 or the tank 120. For example, after the speaker 112 and/or microphone 111 is placed within the cavity inserted in the toilet 100, additional material may be placed in the cavity. This may be accomplished using at least one of insert molding, injection molding, blow molding, compression molding, extrusion molding, gas assist (i.e., gas injection) molding, rotational molding, structural foam molding, thermoforming, matrix molding, or transfer molding.

In some embodiments, the speaker 112 emits sounds derived from the sounds received at the microphone 111 in real time or near real time. The speaker 112 is configured to produce sounds inversely (i.e., 180° out of phase) related to the noises related to the toilet 100. These are considered 'anti-noises'.

Figure 2:
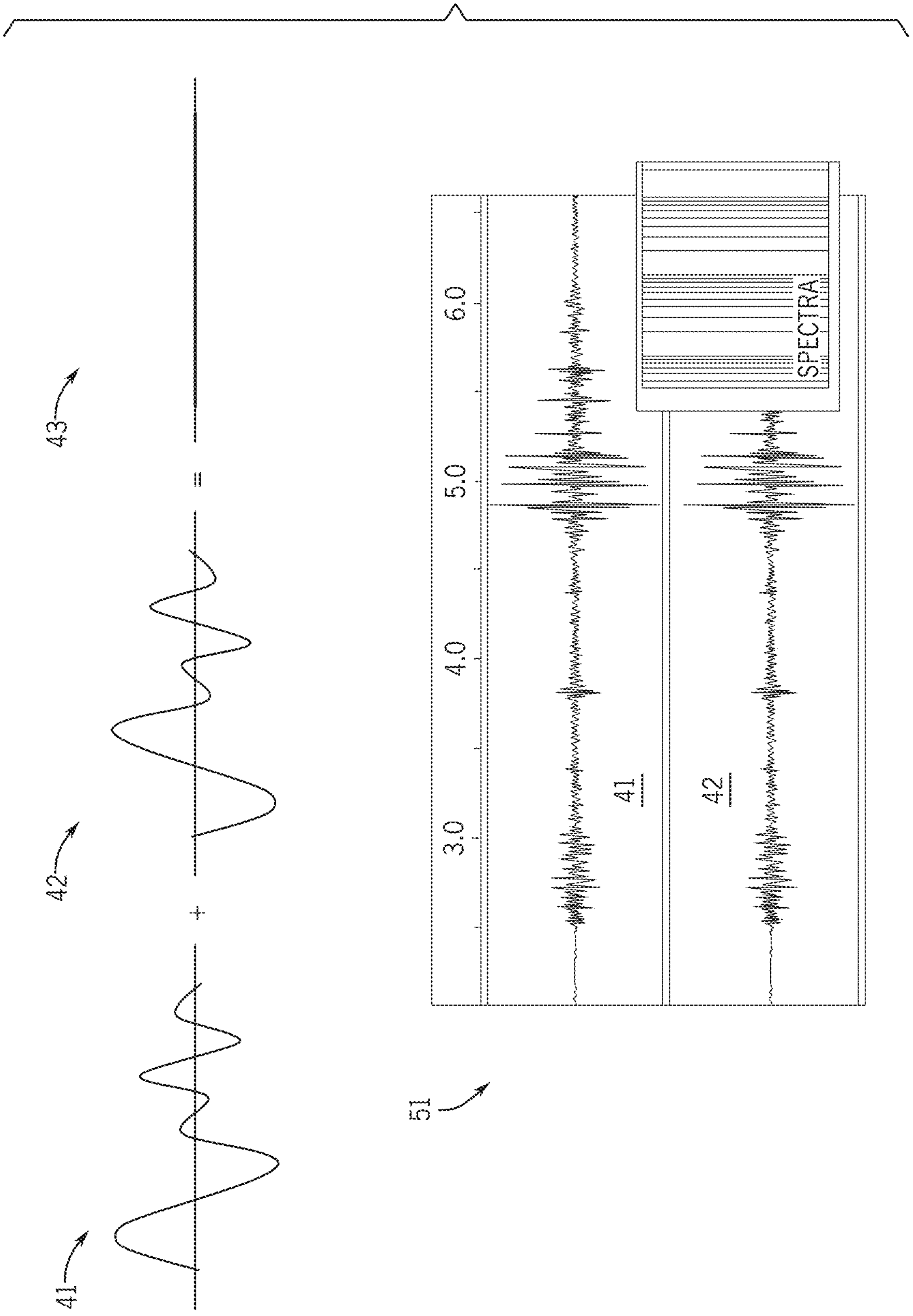
FIG. 2 illustrates an example comparisons of noise associated with toilet and anti-noise from a noise cancellation system.

In one example, as illustrated by FIG. 2, noise 41 from the toilet is combined with anti-noise 42 to produce output 43. The anti-noise 42 may be the inverse of the noise 41, or an approximation thereof. In one example, the wires or terminal of the microphone 111 are reversed and connected to the speaker 112. In another example, a controller or digital signal processor may analyze the noise 41 from the microphone 111 and generate the anti-noise 42. A chart 51 illustrates that in the frequency domain, the noise 41 and anti-noise 42 cancel to substantially zero power spectra.

The noise 41 and the anti-noise 42 are added together in space. The sounds are vibrations that travel as waveforms through space. The waveforms are constructively additive. That is, the amplitude of the noise 41 and the amplitude of the anti-noise 42 may be combined or added in space. The amplitude of the noise 41 may be predominately the opposite polarity of the anti-noise 42. That is, when the noise 41 has positive values, the anti-noise 42 substantially has negative values, and vice versa. As shown by output 43, the resultant value or resultant sound may be zero or within a range of zero.

In some embodiments, the speaker 112 emits pre-recorded sounds. The pre-recorded sounds may be anti-noise 42 that is determined to be the inverse of typical toilet associated noises. The pre-recorded sounds may include the inverse of noise from waste being expelled from the body and/or striking the toilet or water within the toilet bowl. The pre-recorded sounds may include the inverse of sounds in the flushing sequence and/or refilling water into the tank.

In some embodiments, the speaker 112 emits predetermined sounds that are calculated over a time period based on the sounds received at the microphone 111. For example, the predetermined sounds may be the average of past sounds produced at or near the toilet. The predetermined sounds may be the average of sounds produced at or near the toilet. The predetermined sounds may be divided according to time of day. A first predetermined sound may be used during daytime hours and a second predetermined sound may be used during nighttime hours. The microphone 111 may detect any noise, and in response, the predetermined sound is access and played through the speaker 112.

The predetermined sounds may be divided according to the flush cycle. A first predetermined sound may be used in response to a flush cycle, and a second predetermined sound may be used in the absence of a flush cycle.

Figure 3:
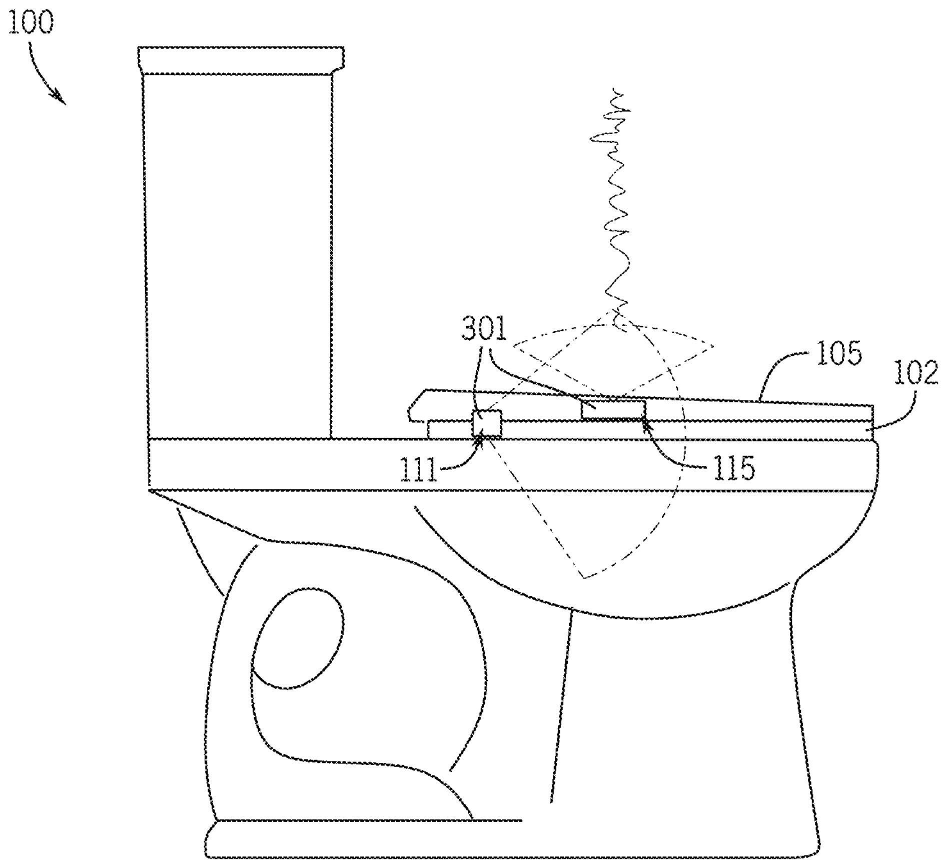
FIG. 3 illustrates an example lid-mounted transducer for a noise cancellation system.

FIG. 3 illustrates an example lid-mounted transducer for a noise cancellation system. The toilet 100 in this example includes a transducer 115 (e.g., for speaker 112) embedded in the lid 105 configured to cover a bowl of the toilet 100. The toilet 100 may also include a microphone 111 configured to detect noises associated with the toilet 100 and embedded and/or supported by the seat 102 or a hinge assembly connected to the seat 102. In the embodiment of FIG. 3, the lid 105 and the seat 102 should be closed for the noise cancellation system to be most effective. An automatic closing device may be coupled to the toilet 100 to cause the lid 105 and/or the seat 102 to close at a predetermined time in a flush cycle. The automatic closing device may be activated in response to the detected noises from the microphone 111 and generate signals for the transducer 115. A controller 301 may receive signals for the detected noises from the microphone 111 and generate signals for the transducer 115. The controller 301 may send a command to the automatic closing device. Additional, different, or fewer components may be included.

The transducer 115 includes a coil coupled to the lid 105 and a magnet coupled the lid 105. The transducer 115 is configured to causes vibrations in the lid 105 to emit sounds derived from the detected noises associated with the toilet 100. The magnet is configured to produce a magnet field that affects the coil. A current through the coil causes the vibration under the magnet field. The current may be generated directly by the microphone 111. The current may be generated by a controller or a driving circuit that sends the predetermined sounds or pre-recorded sounds described herein.

For example, a memory is configured to store data for the noises associated with the toilet. The memory is included with the controller 301 or otherwise electrically coupled to the controller 301. The controller 301 is configured to access the memory to retrieve the stored data and provide the stored data to the transducer 115. The controller 301 may convert the stored data to a predetermined format so that power is provided to the transducer 115 in amplitudes and frequencies defined by the stored data.

The controller 301 may also include, or otherwise be electrically coupled to, an amplifier. The amplifier is configured to provide the current to the coil according to the stored data for the noises associated with the toilet 100. The amplifier may include one or more transistors or other switches for switching power to the transducer 115. A power supply circuit may be included with the amplifier, and the power supply circuit may connect to a battery or outlet source of power.

The controller 301 may also include, or otherwise be electrically coupled to, a filter. The filter may be used to convert the sound received by the microphone 111 to the signal provided from the controller 301 to the transducer 115. The filter may be configured to remove certain frequencies of the noises associated with the toilet. The filter may be 'high pass', 'low pass', 'band pass', or combinations of these. It may be of interest to eliminate frequencies that interfere with the operation of the cancellation system. The filter may be tuned according to the sounds reproduceable by the lid 105 acting as a speaker. That is, the speaker formed through movement of the lid 105 and the transducer 115 has a frequency response that is different than the spectrum of frequency detectable by the microphone 111. The filter may be a band pass filter defined by a high cutoff frequency or both a low cutoff frequency and a high cutoff frequency selected according to the lid 105.

In one example, the filter may substantially remove frequency components of the audio signal detected by the microphone 111 that are outside of a predetermined range (e.g., 50 Hz-2000 Hz or 100 Hz-1000 Hz). The filtered signal, when inverted and provided to the transducer 115, may produce anti-noise that is substantially deconstructive to the sound in the room.

The filtered and inverted signal may remove a predetermined portion of the power of the sound in the room. Example predetermined portions may include 50%, 80%, 90% or another value.

The controller 301 may be operable in a full spectrum noise cancellation mode where the filter is not used and a partial spectrum noise cancellation mode where the filter is used. Using the filter may provide the range where human hearing is most sensitive and provide the perception of fully cancelled noise or an estimation of fully cancelled noise and at the same time require less signal processing resources (e.g., slower processing and/or less memory) and less costly audio components (e.g., microphones and speakers). The filter may also be configured to operate in the frequency range of the predominant noise during the toilet flush or toilet refill.

The controller 301 may also be configured to access the memory for prestored anti-noise data in response to sound detected at the microphone 111. That is, rather than pass through or manipulate the sound detected at the microphone 111 for the transducer 115, the controller 301 detects the existence of sound from the microphone 111 and selects the prestored anti-noise data in response to the detected sound. In one example, the prestored anti-noise data includes portions of masking noise. The masking noise may simulate the sounds of a crackling fire, a crowded bar, or a voices in a crowd. The anti-noise may have portions of music or other designer noises. The masking noise and/or anti-noise may be at an amplitude (e.g., pressure) that corresponds to the sound detected at the microphone 111.

The controller 301 may select or determine the prestored anti-noise data from a plurality of stored data files. The choice of prestored anti-noise data may be determined by a user selection. The controller 301 may be coupled to an input device such as a touchscreen, a remote control, or a mobile device such as a tablet or smartphone. The controller 301 may access the selected anti-noise data and provide the signals to the transducer in response to the user selection. Thus, the user can demonstrate playback with noise associated with the toilet 100 is being produced in order to select an appropriate set of anti-noise data.

The choice of pre-stored anti-noise data may be determined by classification of a type of the noises associated with the toilet. The microphone 111 may detect noises produced at or near the toilet 100, and the controller 301 may analyze these noises in order to classify the noises as one or more types. The types of noises may include solid human waste being expelled from the body, liquid human waste being expelled from the body, gaseous emission being expelled from the body, solid and/or liquid wastes striking the toilet or water within the toilet bowl, a flushing sound, a tank refilling sound, or any combination thereof. The controller selects the prestored anti-noise data in response to classification of the detected sounds.

The choice of prestored anti-noise data may be determined by identification of a user in proximity to the toilet 100. The toilet 100 may include a camera, proximity sensor, heat sensor, or other device configured to identify the user. The user may also be identified through wireless communication where the controller 301 connects or identifies a beacon from the mobile device of the user. In response to the identification of the user, the controller 301 selects the anti-noise data and provides the anti-noise data to the transducer. In some examples, the anti-noise data is the inverse of an average of sounds previously produced in association with a particular user.

Figure 4:
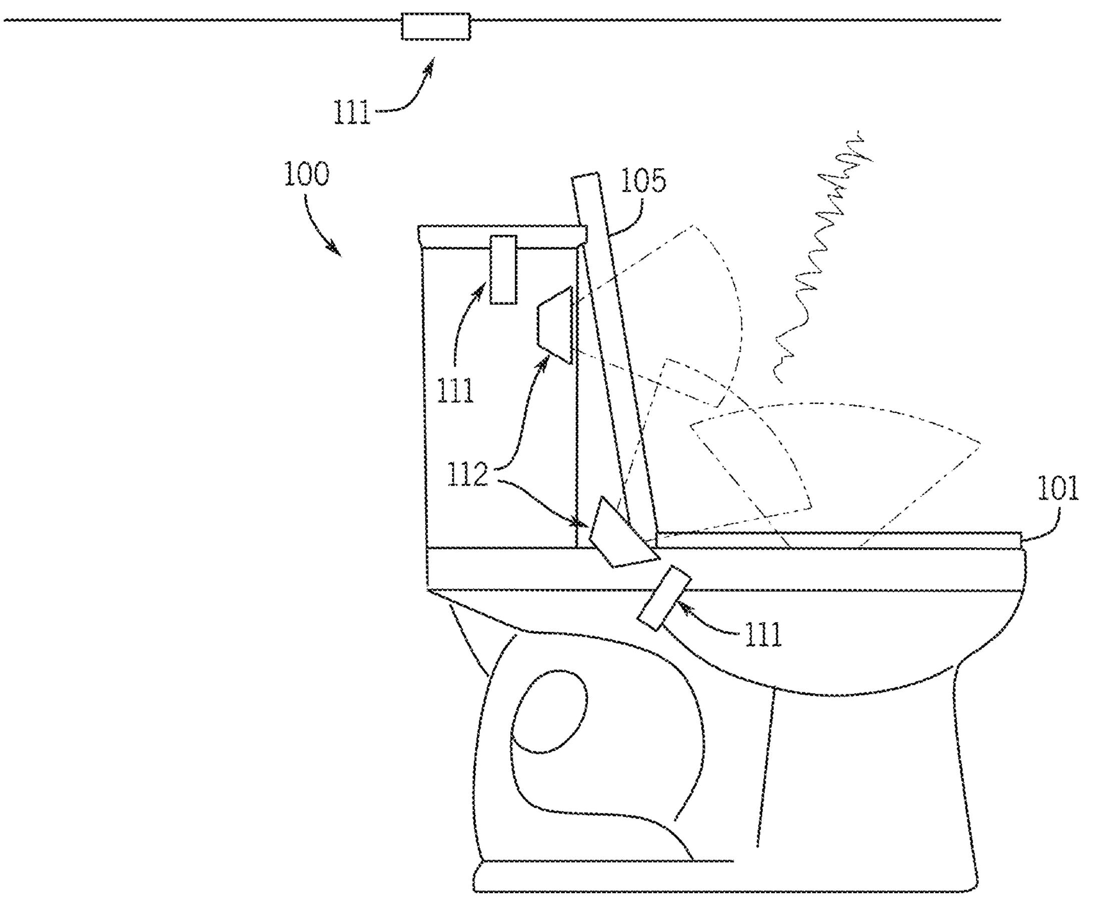
FIG. 4 illustrates an example toilet with a noise cancellation system including externally mounted speakers.

FIG. 4 illustrates an example toilet with a noise cancellation system including externally mounted speakers 112. In addition, or in the alternative, the noise cancellation system may include multiple microphones 111.

The additional speakers 112 or microphones 111 may be mounted on other plumbing fixtures in proximity to the toilet 100. Example other plumbing fixtures may include a bathtub, a faucet or a shower. The additional speakers 112 or microphones 111 may be mounted on a mirror, vanity, or other objects in proximity to the toilet 100. In these examples, the microphones 111 may detect a more descriptive collection of sound signals for the noise associated with the toilet 100. In addition, the collection of microphones 111 may detect noises from the faucet, shower, bathtub, or other devices in the bathroom.

At least one of the speakers 112 or microphones 111 may be mounted on a wall or ceiling. The wall or ceiling mounted device may communicate wirelessly (e.g., with controller 301 via Bluetooth, Wi-Fi, radio, or another communication protocol).

In the case of multiple microphones 111, the controller 301 is configured to combine the detected sound signals, and in response generate the anti-noise based on the combination. The controller 301 may scale or otherwise project the detected sounds signals to a predetermined perception point in the 3D space of the bathroom. That is, depending on the location of each microphone 111, the controller 301 may apply a scaling factor or coefficient to the associated sound signals before adding the multiple sound signals together. The predetermined perception point may be the doorway of the bathroom. The predetermined perception point may be at the toilet 100 (e.g., at a set position above the seat 102).

When multiple speakers 112 are used, the controller 301 may determine a different anti-noise to be played at each speaker 112. The playback sounds may be scaled (multiplied by a factor) or otherwise adjusted based on the location of the speaker 112. The playback sounds may be delayed (phase shift, or t=t+1 time shift). That is, depending on the location of each speaker 112, the controller 301 may apply a scaling factor, time delay, or coefficient to the associated anti-noise before playback.

Figure 5:
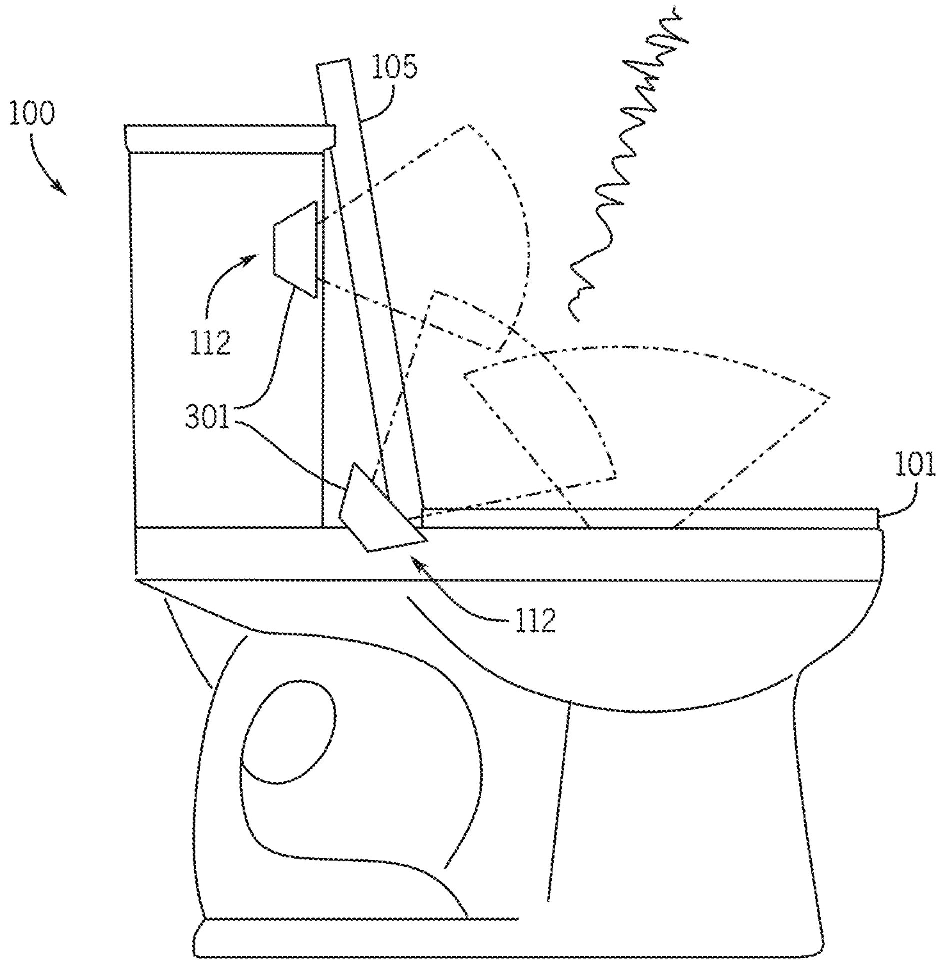
FIG. 5 illustrates an example toilet with a noise cancellation system with multiple speakers.

FIG. 5 illustrates an example toilet with a noise cancellation system with multiple speakers 112. In this example, microphones are omitted. The controller 301 may select the prestored anti-noise data in response to the flush cycle of the toilet 100. The flush signal may be indicated by a flush handle. The flush handle may include a mechanical flush lever. The flush handle may generate an electronic flush signal provided to the controller 301, which is triggered by moving the flush handle or a proximity sensor. In response to the flush signal, the controller 301 provides the pre-stored anti-noise data or signal to the speakers 112 at a predetermined timing of the flush cycle. Different anti-noise may be provided for a first part of the flush cycle (e.g., syphon break) and a second part of the flush cycle (e.g., tank refill).

Figure 6:
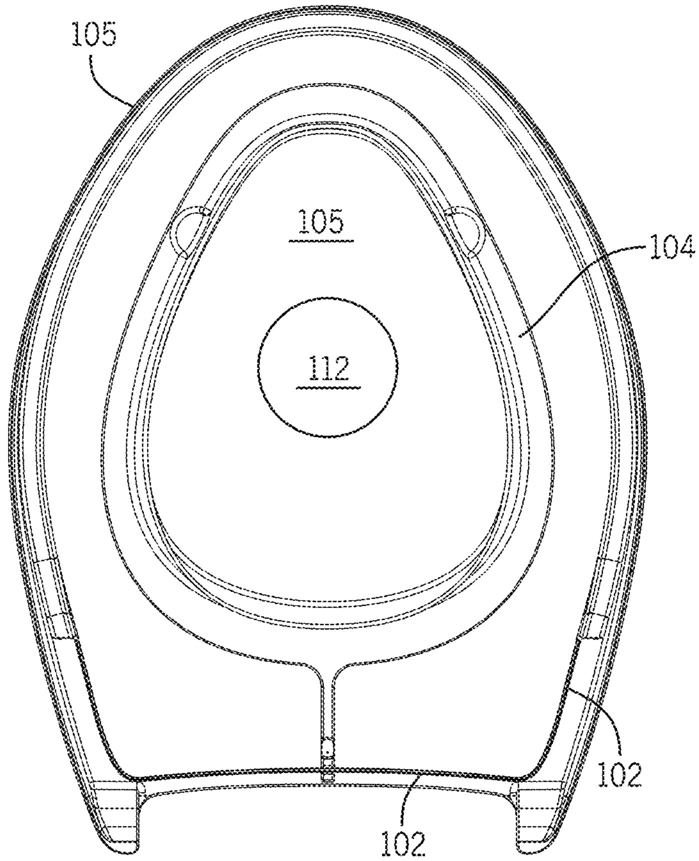
FIG. 6 illustrates an example lid with an integrated speaker.
Figure 7:
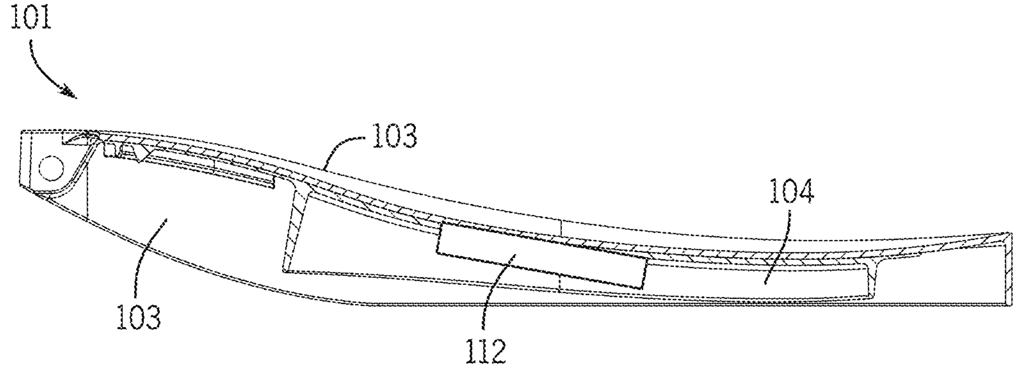
FIG. 7 illustrates a side of the lid with an integrated speaker.

FIG. 6 illustrates an example lid 105 with an integrated speaker 112. FIG. 7 illustrates a side of the lid 105 with the integrated speaker 112. The seat 102 may include an inner seal 104 that surrounds the integrated speaker 112. The lid 105 may flex against the seat 102 to create a similar effect to a cone. As the seat 102 is vibrated in response to actuation of the speaker 112, waves travel through the air within the circumference of the space bounded by the seal 104.

The lid 105 may include an array of speakers 112. The array of speakers 112 may include a plurality of coils including the coil, and each of the plurality of coils coupled to the lid and configured to causes vibrations in the lid to emit sounds. Each of the coils may be paired with a magnet configured to produce a magnet field that causes movement in the corresponding coil and vibrates the lid 105.

Figure 8:
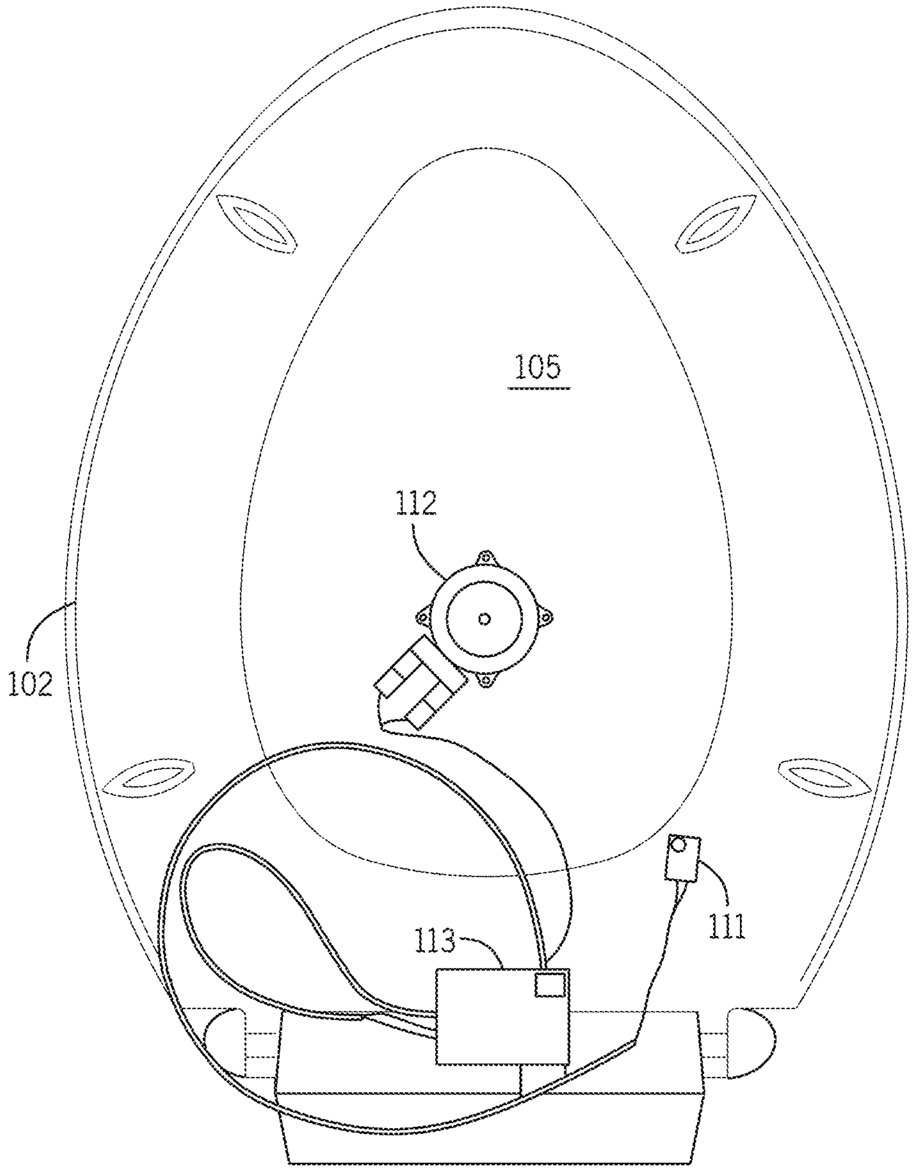
FIG. 8 illustrates a noise cancellation system including a microphone and the integrated speaker.

FIG. 8 illustrates a noise cancellation system including a microphone 111, the integrated speaker 112, and a printed circuit board 113, for example, including the controller 301 configured to receive the detected noises associated with the toilet 100 from the microphone 111 and either select at least one predetermined sound based on noise, invert the detected noises, or both. The selected predetermined sounds and/or inverted noise is provided to the speaker 112. The PCB may include the controller, amplifier circuit, filter circuit, and/or other components for implementing the noise cancellation system.

Figure 9:
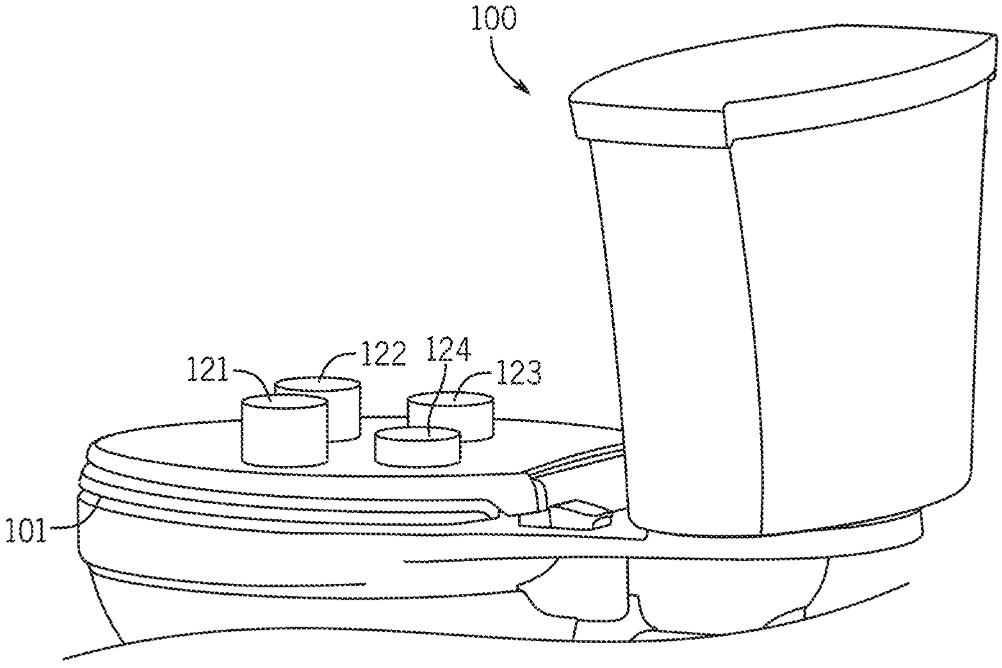
FIG. 9 illustrates lid-mounted resonators for a noise cancellation system.

FIG. 9 illustrates a lid-mounted resonator for the noise cancellation system. The resonator may include multiple resonator chambers 121, 122, 123, and 124. Each of the resonator chambers have a partially enclosed chamber of a particular volume (V). One side of the resonator chambers, which may be the bottom side closest to the toilet bowl has a particular thickness (L). An opening (A) extends through the side with the thickness (L). The size and dimensions of each chamber may correspond to the wavelength of a harmonic of the noise of the toilet 100. The resonator may be combined with the integrated speaker 112 described herein.

Figure 10:
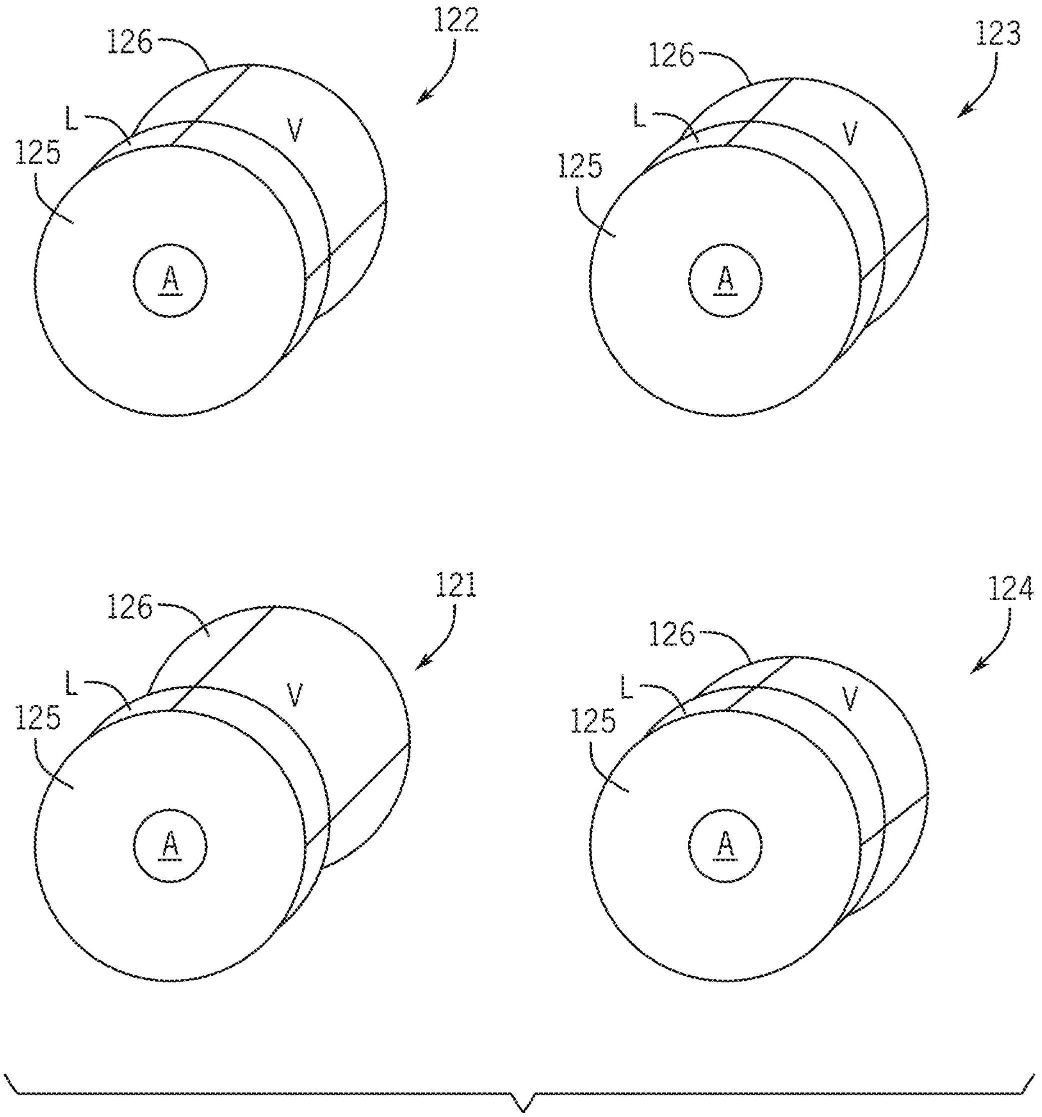
FIG. 10 illustrates detailed views of the lid mounted resonators of FIG. 9.

FIG. 10 illustrates detailed views of the lid mounted resonators of FIG. 9. Each of the resonators includes multiple physical properties that impact the frequency or range of frequencies that will be substantially dampened by the resonators. Equation 1 describes the relationships between the physical properties and the targeted frequency. The physical properties include the area of the opening A, the thickness L of the bottom wall 125 through which the opening A extends, and the overall volume V of the chamber 126. C is the speed of sound in the medium, which may be estimated as air, having a value of, for example, 343 meters per second.

$$F_{res} = \frac{c}{2\pi}\sqrt{\frac{A}{VL}} \qquad \text{Eq. 1}$$

The dimensions of the resonator chamber may be selected using Equation 1. Any one or a combination of the size of the opening area A, the thickness L of the bottom wall, or another dimension is varied. The other dimension allows the volume V to be adjusted while keeping the thickness L and the opening area A the same.

In some examples, the physical properties of the resonators are selected from one or more targeted frequencies. The sounds produced by the toilet (or other sounds in the bathroom) may be measured and recorded as a function of time. The Fourier transform may be performed on the time-based function to calculate the frequency spectra of the sounds. From the spectra, high power (or high energy) frequencies or ranges of frequencies may be identified. These dominant frequencies may be designated and used to select the geometric properties of the resonator using Equation 1.

Any number of frequencies or ranges of frequencies may be selected. In the example of FIGS. 9 and 10, the top four highest power frequencies may be selected.

Figure 11A:
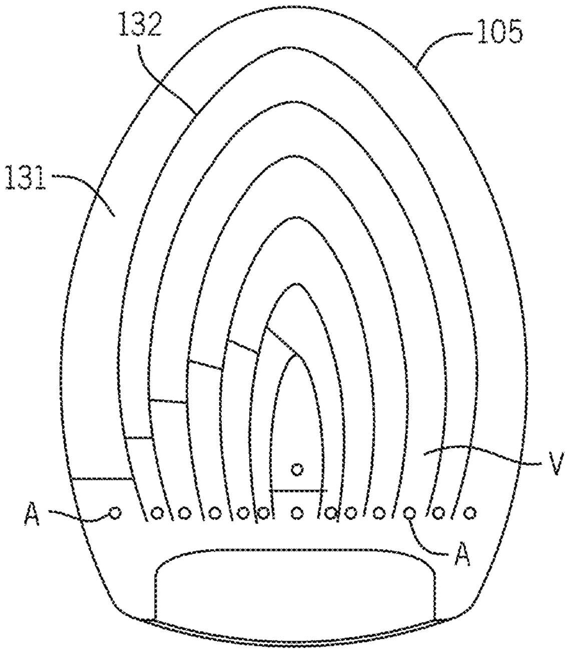
FIGS. 11A and 11B illustrate example integrator resonators for a lid.
Figure 11B:
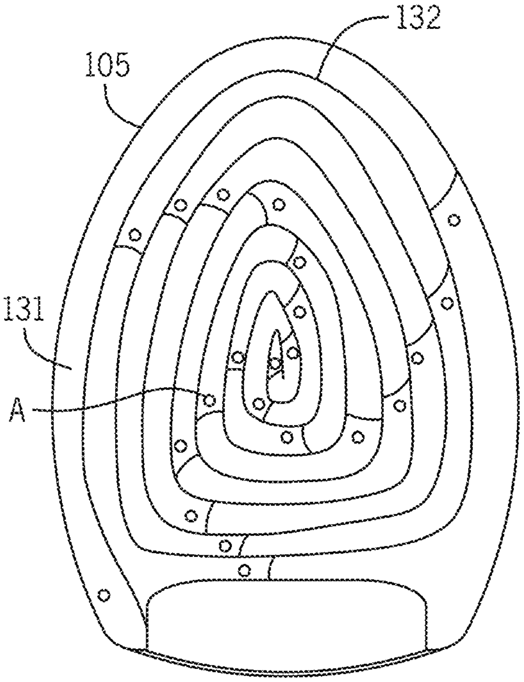

FIGS. 11A and 11B illustrate example integrator resonators for a lid 105. The resonator may include Hemholtz resonators 131. FIG. 11A includes an example lid 105 with 14 Hemholtz resonators 131, each having an opening A. The lid 105 has a top side, as shown, and a bottom sided, substantially parallel to the top side. One or more dividers 132 extend from the top side to the bottom side. The dividers 132 create chambers and each chamber is associated with one of the openings A. The chambers have volume V. Thus, equation 1 also applies to the resonators formed within the lid 105. FIG. 11A includes an example lid 105 with 14 Hemholtz resonators 131. FIG. 11B includes an example lid 105 with 22 Hemholtz resonators 131.

The Hemholtz resonators may have cavities based on the ¼ wavelength of frequencies in the toilet noise. These are cavities of specific dimensions placed within the bowl. When excited by acoustical pressure they resonate with the inverse pressure signal to cancel the noise in a frequency band around the ¼ wavelength. The cavities or chambers may be adjusted depending on the targeted frequencies. In one example, the chamber may include an adjustable connection with the lid 105 (e.g., the chamber may include threads to be screwed into or out of the lid 105 to adjust the volume of the cavity).

Figure 12:
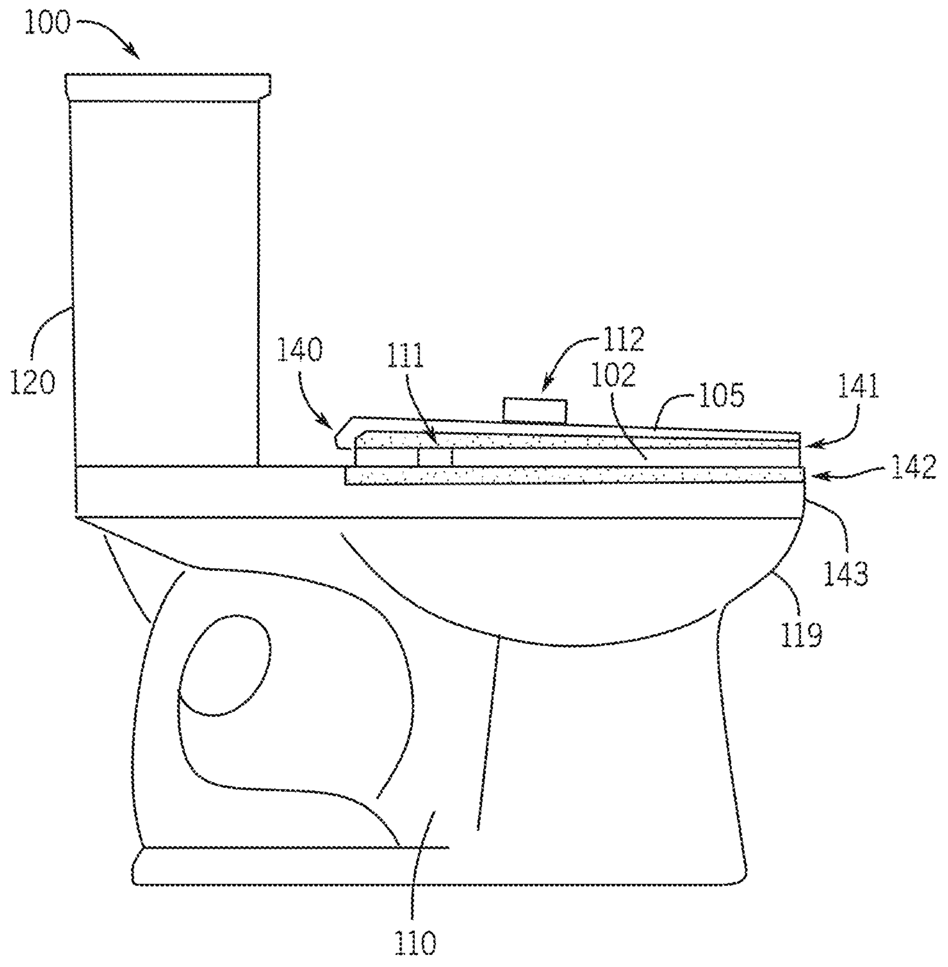
FIG. 12 illustrates another embodiment of a noise cancellation system.

FIG. 12 illustrates another embodiment of a noise cancellation system for another example toilet 100. As before, the toilet 100 includes the speaker 112 and/or the microphone 111 may be supported by the vitreous china and/or the toilet seat assembly 140. In this embodiment, the toilet 100 also includes a muffler. As shown, the muffler includes a first padding 141 between the lid 105 of the toilet seat assembly 140 and the seat 102 of the toilet seat assembly 140, and includes a second padding 142 between the seat 102 of the toilet seat assembly 140 and the vitreous surface (e.g., rim 143) of the bowl 119. The muffler of FIG. 12 may be combined with any of the other embodiments described herein.

The muffler is configured to block noise passively. For example, the muffler may reduce high frequency noise (i.e., in a predetermined frequency range) from escaping the interior of the bowl by forming a first acoustic seal between the lid 105 and the seat 102 and a second acoustic seal between the seat 102 and the rim 143.

In this embodiment, a first range of frequencies (i.e., low frequencies) may be substantially cancelled by the anti-noise produced by the speaker 112 and a second range of frequencies (i.e., high frequencies) are blocked or otherwise attenuated by the muffler.

Figure 13:
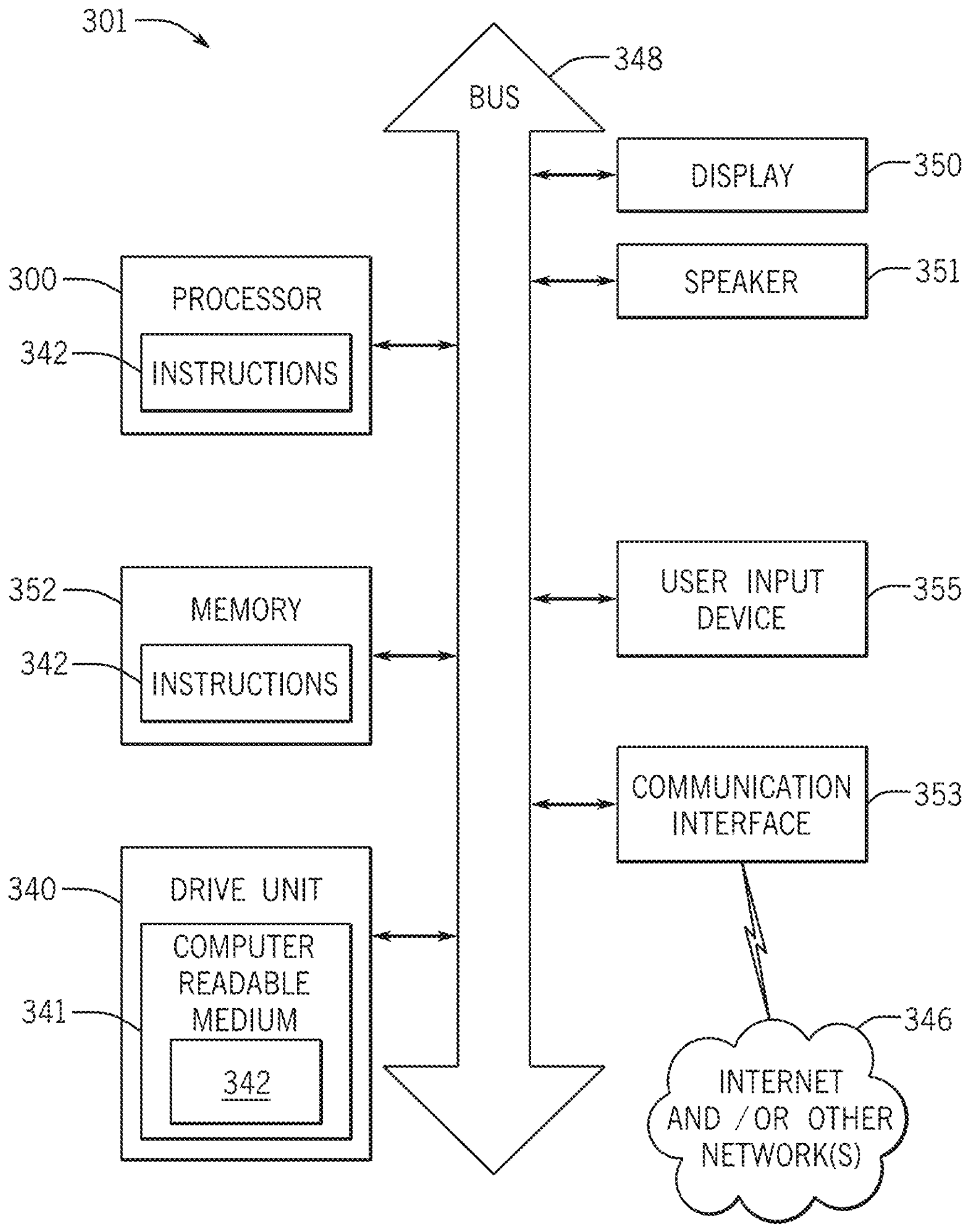
FIG. 13 illustrates an example controller for any of the disclosed embodiments.

FIG. 13 illustrates an example control system or controller 301 for any of the embodiments described herein. The controller 301 may include a processor 300, a memory 352, and a communication interface 353 for interfacing with devices or to the internet and/or other networks 346. In addition to the communication interface 353, a sensor interface may be configured to receive data from the sensors described herein or data from any source. The components of the control system may communicate using bus 348. The control system may be connected to a workstation or another external device (e.g., control panel) and/or a database for receiving user inputs, system characteristics, and any of the values described herein.

Figure 14:
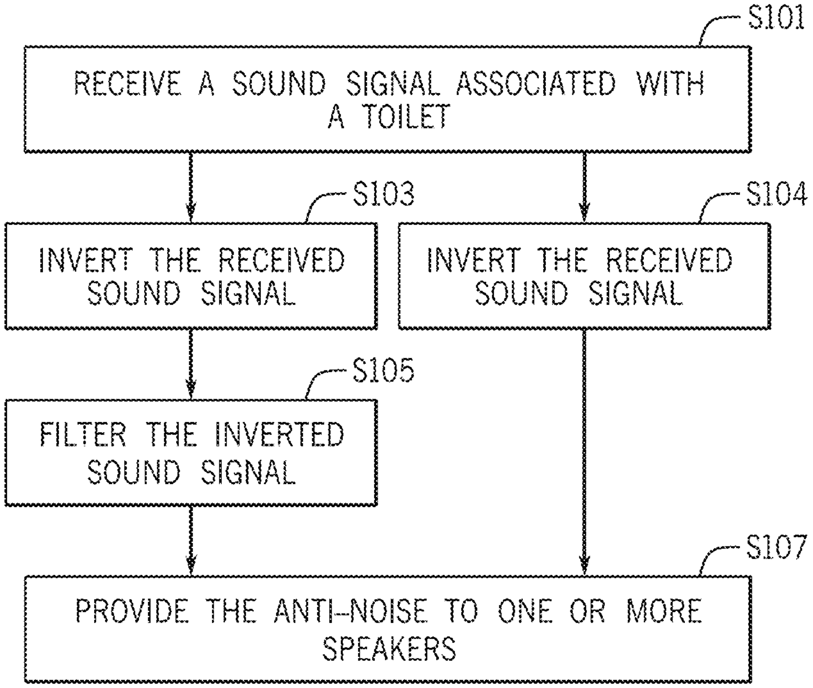
FIG. 14 illustrates an example flow chart for the operation of the controller of FIG. 13.

FIG. 14 illustrates an example flowchart for operation of the controller 301. Additional, fewer or different acts may be included.

At act S101, the controller 101 receives a sound signal associated with a toilet as detected by a microphone. The sound associated with the toilet may include a splash related to human excrement hitting water. The sound associated with the toilet may include a collision of human excrement with the vitreous of the toilet. The sound associated with the toilet may include the sound of the vacuum breaking in the trapway of the toilet. The sound associated with the toilet may include the sound of water filing the tank. The sound associated with the toilet may include rinse water or sump water rushing from the tank through the toilet.

In some examples, at act s103, the controller 301 inverts the received signal and at act S105, filters the inverted sound signal to calculate the anti-noise signal. The inversion may be a mathematical calculation performed on discrete or digital values for the sound. As an alternative or addition to the controller 301, the inversion may be performed by an analog circuit.

In some examples, at act S104, the controller 301 selects a pre-stored anti-noise signal in response to the received sound signal. One pre-stored signal may be stored for filling the tank, another pre-stored signal may be stored for flushing the toilet, another pre-stored signal may be stored for liquid contacting the water in the bowl, another pre-stored signal may be stored for solids contacting the water in the bowl, etc.

At act S107, the controller 301 provides the anti-noise to one or more speakers to eliminate the unwanted sounds associated with the toilet through acoustic deconstruction.

Optionally, the control system may include an input device 355 and/or a sensing circuit 356 in communication with any of the sensors. The sensing circuit receives sensor measurements from sensors as described above. The input device may include any of the user inputs such as buttons, touchscreen, a keyboard, a microphone for voice inputs, a camera for gesture inputs, and/or another mechanism.

Optionally, the control system may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be an indicator or other screen output device. The display 350 may be combined with the user input device 355.

Processor 300 may be a general purpose or specific purpose processor, an application specific integrated circuit (ASIC), one or more programmable logic controllers (PLCs), one or more field programmable gate arrays (FPGAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, the memory 352 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An active noise cancellation system for a toilet, the active noise cancellation system comprising:

a lid configured to cover a bowl of the toilet;

a microphone configured to detect noises associated with the toilet; and a coil coupled to the lid and configured to cause vibrations in the lid to emit sounds derived from the detected noises associated with the toilet.

2. The active noise cancellation system of claim 1, further comprising:

a magnet configured to produce a magnet field that affects the coil, wherein a current through the coil causes the vibrations under the magnet field.

3. The active noise cancellation system of claim 1, further comprising:

a memory configured to store data for the noises associated with the toilet; and an amplifier configured to provide a current to the coil according to the stored data for the noises associated with the toilet.

4. The active noise cancellation system of claim 3, wherein the noises associated with the toilet are selected based on a user selection, a detected user, or a type of the noises associated with the toilet.

5. The active noise cancellation system of claim 1, further comprising:

a filter configured to remove certain frequencies of the noises associated with the toilet.

6. The active noise cancellation system of claim 1, wherein the microphone is supported by a toilet seat.

7. The active noise cancellation system of claim 1, wherein the microphone is supported by a vitreous material.

8. The active noise cancellation system of claim 1, wherein the microphone is supported by a wall or ceiling.

9. The active noise cancellation system of claim 1, further comprising:

a plurality of coils including the coil, each of the plurality of coils coupled to the lid and configured to causes vibrations in the lid to emit sounds; and a plurality of magnets including the magnet, each of the plurality of magnets configured to produce a magnet field that affects one or more of the plurality of coils.

10. The active noise cancellation system of claim 1, further comprising:

at least one speaker configured to produce sounds inversely related to the noises related to the toilet.

11. The active noise cancellation system of claim 1, further comprising:

a controller configured to receive the detected noises associated with the toilet from the microphone and select at least one predetermined sound based on noise.

12. The active noise cancellation system of claim 1, further comprising:

a resonator coupled to the lid, wherein the resonator cancels the noises associated with the toilet.

13. An active noise cancellation system for a toilet, the active noise cancellation system comprising:

a lid configured to cover a bowl of the toilet; and a resonator coupled to the lid, wherein the resonator cancels the noises associated with the toilet.

14. The active noise cancellation system of claim 13, further comprising:

a coil coupled to the lid and configured to causes vibrations in the lid to emit sounds.

15. The active noise cancellation system of claim 14, further comprising:

a microphone mounted on the toilet and configured to detect noises associated with the toilet, wherein the coil produces vibrations in the lid based on an inverse of the noises detected by the microphone.

16. The active noise cancellation system of claim 14, further comprising:

a memory configured to store predetermined anti-noise, wherein the coil produces vibrations in the lid based on the predetermined anti-noise.

17. The active noise cancellation system of claim 16, wherein the predetermined anti-noise includes a masking noise.

18. A method comprising:

receiving one or more sounds associated with a toilet; and generating, at an anti-noise device mounted to a lid of the toilet, an inverted sound response at least partially an inverse of the one or more sounds associated with the toilet, wherein the anti-noise device includes a resonator.

* * * * *